US006329965B1

(12) United States Patent
Lee

(10) Patent No.: US 6,329,965 B1
(45) Date of Patent: Dec. 11, 2001

(54) ADJUSTABLE HEAD MOUNTED DISPLAY APPARATUS AND METHOD OF ADJUSTING A HEAD MOUNTED DISPLAY

(75) Inventor: Sang Jae Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/124,237

(22) Filed: Jul. 29, 1998

(30) Foreign Application Priority Data

Jul. 29, 1997 (KR) .................................................. 97-35711

(51) Int. Cl.[7] ........................................................ G09G 5/00
(52) U.S. Cl. ................................................ 345/8; 359/630
(58) Field of Search .................................. 345/8; 349/11; 359/13, 630, 633; 348/115

(56) References Cited

U.S. PATENT DOCUMENTS

| 5,151,722 | * | 9/1992 | Massof et al. ........................ 351/158 |
| 5,162,828 | * | 11/1992 | Furness et al. ....................... 353/122 |
| 5,485,172 | * | 1/1996 | Sawachika et al. ....................... 345/8 |
| 5,712,649 | * | 1/1998 | Tosaki ........................................ 345/8 |
| 6,046,712 | * | 4/2000 | Beller et al. ............................... 345/8 |
| 6,050,717 | * | 4/2000 | Kosugi et al. .......................... 364/146 |

\* cited by examiner

*Primary Examiner*—Bipin Shalwala
*Assistant Examiner*—Ricardo Osorio
(74) *Attorney, Agent, or Firm*—Finnegan, Henderson, Farabow, Garrett & Dunner, L.L.P.

(57) ABSTRACT

An adjustable head mounted display apparatus includes an outer casing, an image display unit disposed in the outer casing for generating an image, and a reflection unit adjustably disposed to each side of the image display unit with a predetermined distance therebetween so as to reflect the image generated from the image display unit. The apparatus also includes a lens unit, which is disposed in front of the reflection unit to be adjustable with regard to a distance from the reflection unit, for magnifying the image reflected from the reflection unit, and an optical distance adjust means for adjusting a distance between the image display unit and the reflection unit and between the image display unit and the lens unit. The apparatus allows the optical distance adjust member to maintain a constant optical distance between the image display unit and the reflection unit and between the image display unit and the lens unit, or a focal point of the lens so as to provide a stable screen image and preventing eye fatigue.

10 Claims, 6 Drawing Sheets

ADJUSTABLE HEAD MOUNTED DISPLAY APPARATUS AND METHOD OF ADJUSTING A HEAD MOUNTED DISPLAY

BACKGROUND OF THE INVENTION

1. Field of the Invention

The present invention relates to a head mounted display apparatus, and more particularly, to an adjustable head mounted display apparatus for video images or computer games, wherein the head mounted display apparatus is manually adjustable depending on an eye bridge span of a user while maintaining a constant optical distance between the eyes of a user and a target picture in the apparatus. As a result, a stable picture is supplied to the user, which prevents the user's eye fatigue from increasing.

2. Description of the Background Art

In general, a head mounted display apparatus is employed for playing virtual reality games or experiencing virtual realities. FIG. 1 is a typical structure of a head mounted display apparatus. As shown therein, an outer casing 10 includes a pair of display units 20 disposed at respective front sides thereof in order for a user to view therethrough pictures generated in the apparatus. A grip 30 is attached to each side of the outer casing 10 to facilitate its mounting on a user's head.

An internal structure of the conventional head mounted display apparatus will now be described. An optical system is respectively disposed in each side portion of the case so that a user can view pictures generated therein. The optical system will be explained with reference to FIG. 2. A liquid crystal display (LCD) 40 is disposed in the optical system to generate pictures. A backlight 50 is disposed to the rear of the liquid crystal display 40 along an optical path 70 so as to improve the brightness of the liquid crystal display 40. Also, a reflection plate 60 is disposed to the rear of the backlight 50 along the optical path 70 in order for the light from the backlight to beam towards the liquid crystal display 40.

A reflection mirror 80 is slantingly disposed in front of the liquid crystal display 40 along the optical path 70 so as to reflect by 90 degrees the pictures received from the liquid crystal display 40. A lens 90 is disposed between the reflection mirror 80 and a display unit 20 along the optical path 70 of the light beam reflected from the reflection mirror 80 so that the pictures from the liquid crystal display 40 can reach a user's eye 95. At this time, because the liquid crystal display 40 is provided within a focal distance of a focal point 5 of the lens 90, the virtually imaged pictures viewed by the user become enlarged.

Referring to FIGS. 3A and 3B, the shaping of the virtual image according to an example of the conventional art will now be described in further detail. First, as shown in FIG. 3A, when an object is placed to the position which is outside of the focal point 5 with regard to the lens 90, the image of the object becomes shaped in a reversed real image to an opposite side of the lens 90. Also, as shown in FIG. 3B, when an object is placed between the focal point 5 and the lens 90, the image of the object becomes shaped in an upright virtual image to the same side as the object.

However, the above-described conventional head mounted display apparatus requires two liquid crystal displays because the optical system needs to be disposed in each display unit 20, thereby increasing production cost. Further, the two required backlights 50 disadvantageously increase electrical power consumption.

To solve the above problems, another example of the conventional art is disclosed, wherein a single liquid crystal display is adapted, and its mechanism will be described with reference to FIG. 4. The optical system of a head mounted display apparatus according to the other example of the conventional art includes a liquid crystal display 40 and a backlight 50 disposed behind the liquid crystal display 40. A reflection plate 60 is disposed behind the backlight 50 so as to reflect the light forwardly.

A half-mirror prism block 99 is disposed in front of the liquid crystal display 40 so as to reflect the images from the liquid crystal display 40 along the optical path 70 towards each side. A reflection mirror 80 is disposed to each side of the half-mirror prism block 99 along the optical path 70 so as to convert by 90 degrees the direction of the images reflected from the half-mirror prism block 99. Each lens 90 is correspondingly disposed between the reflection mirror 80 and a display unit which faces a user's eye 95 along the optical path 70. The lens 90 serves to enlarge the images to be focused on the user's eye.

However, the head mounted display apparatus according to the other example of the conventional art is not adjustable to the eye bridge spans of users. As a result, users whose eye bridge spans do not correspond to a preset span of the apparatus suffer increased eye fatigue, while also experiencing poor picture quality.

SUMMARY OF THE INVENTION

The present invention is directed to solve the conventional disadvantages. Accordingly, it is an object of the present invention to provide an adjustable head mounted display apparatus for video images or computer games, wherein the head mounted display apparatus is adjustable depending on an eye bridge span of a user while maintaining a constant optical distance or a focal distance between the eyes of a user and a target picture in the apparatus. In addition, a stable picture supply to the user is obtained, which prevents the users eye fatigue from increasing.

To achieve the above-described object, there is provided an adjustable head mounted display apparatus for video images or computer games consistent with the present invention that includes an outer casing, an image display unit, disposed in the outer casing, for generating an image, a reflection unit, adjustably disposed to each side of the image display unit, for reflecting the image generated from the image display unit, a lens unit, disposed in front of the reflection unit and adjustable with regard to a distance from the reflection unit, for magnifying the image reflected from the reflection unit, and an optical distance adjust member for adjusting a distance between the image display unit and the reflection unit and for adjusting a distance between the reflection unit and the lens unit.

These and other objects and advantages of the present invention will become more readily apparent from the detailed description given hereinafter. However, it should be understood that the detailed description and specific example, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus do not limit the present invention, wherein.

DETAILED DESCRIPTION OF THE PREFERRED EMBODIMENTS

Figure 1:
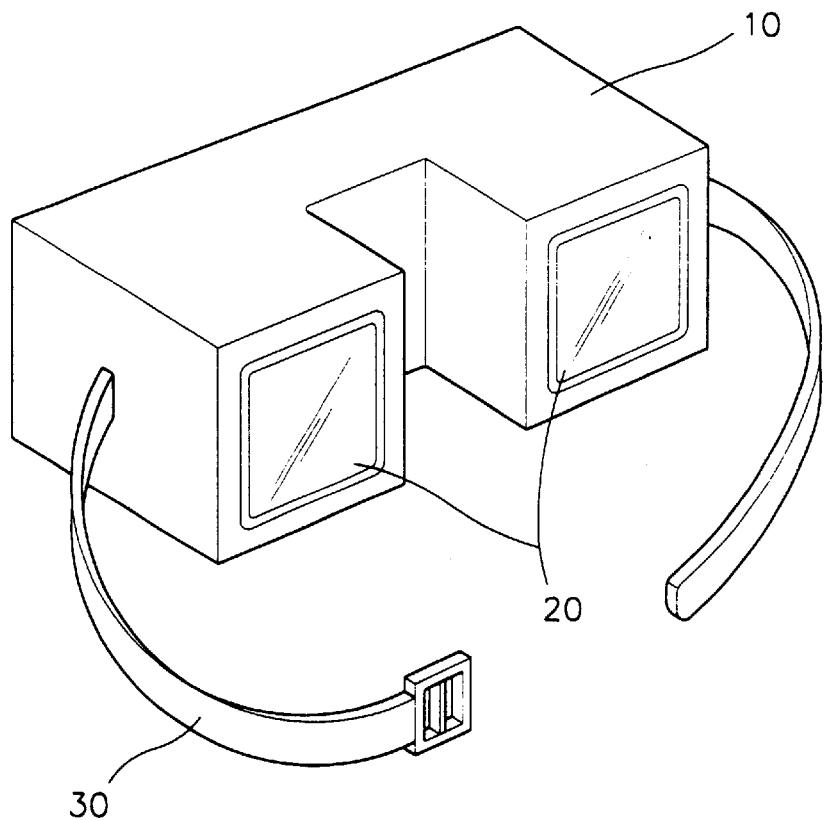
FIG. 1 is a perspective view illustrating a conventional head mounted display apparatus.
Figure 2:
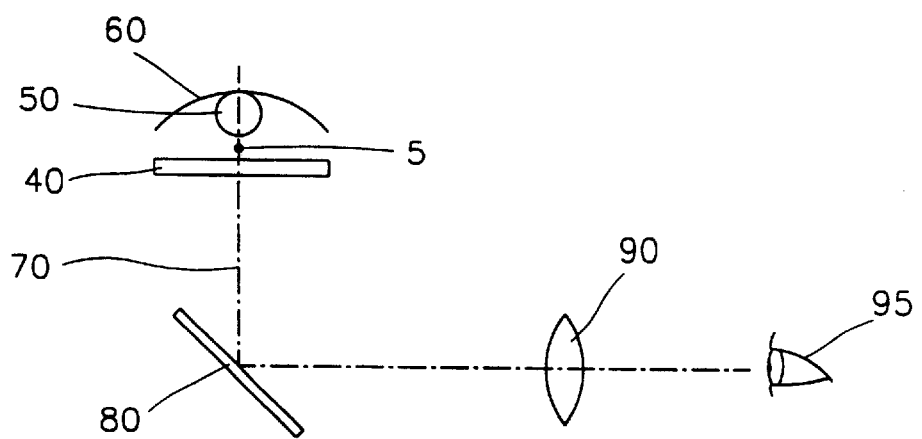
FIG. 2 is a composition view of a head mounted display apparatus according to an example of the conventional art.
Figure 3A:
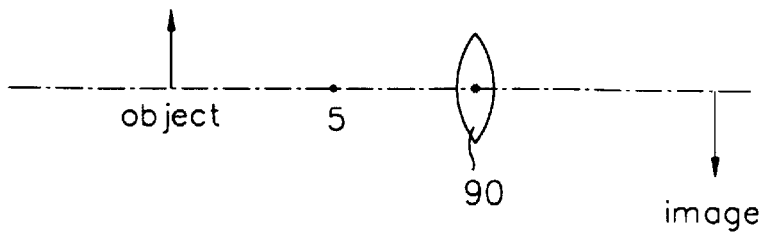
FIG. 3A is a state view illustrating the image shaping with regard to a lens when an object is placed to the left of a focal point.
Figure 3B:
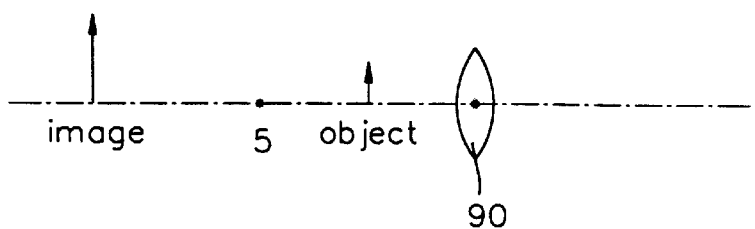
FIG. 3B is a state view illustrating the image shaping with regard to a lens when an object is placed between the focal point and the lens.
Figure 4:
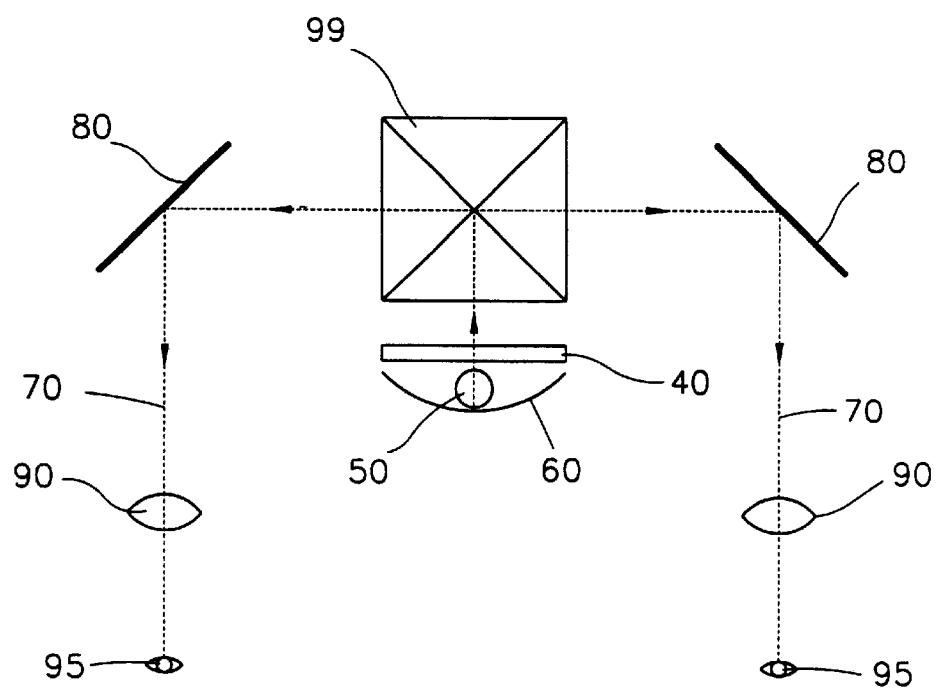
FIG. 4 is a composition view of a head mounted display apparatus according to another example of the conventional art.
Figure 5:
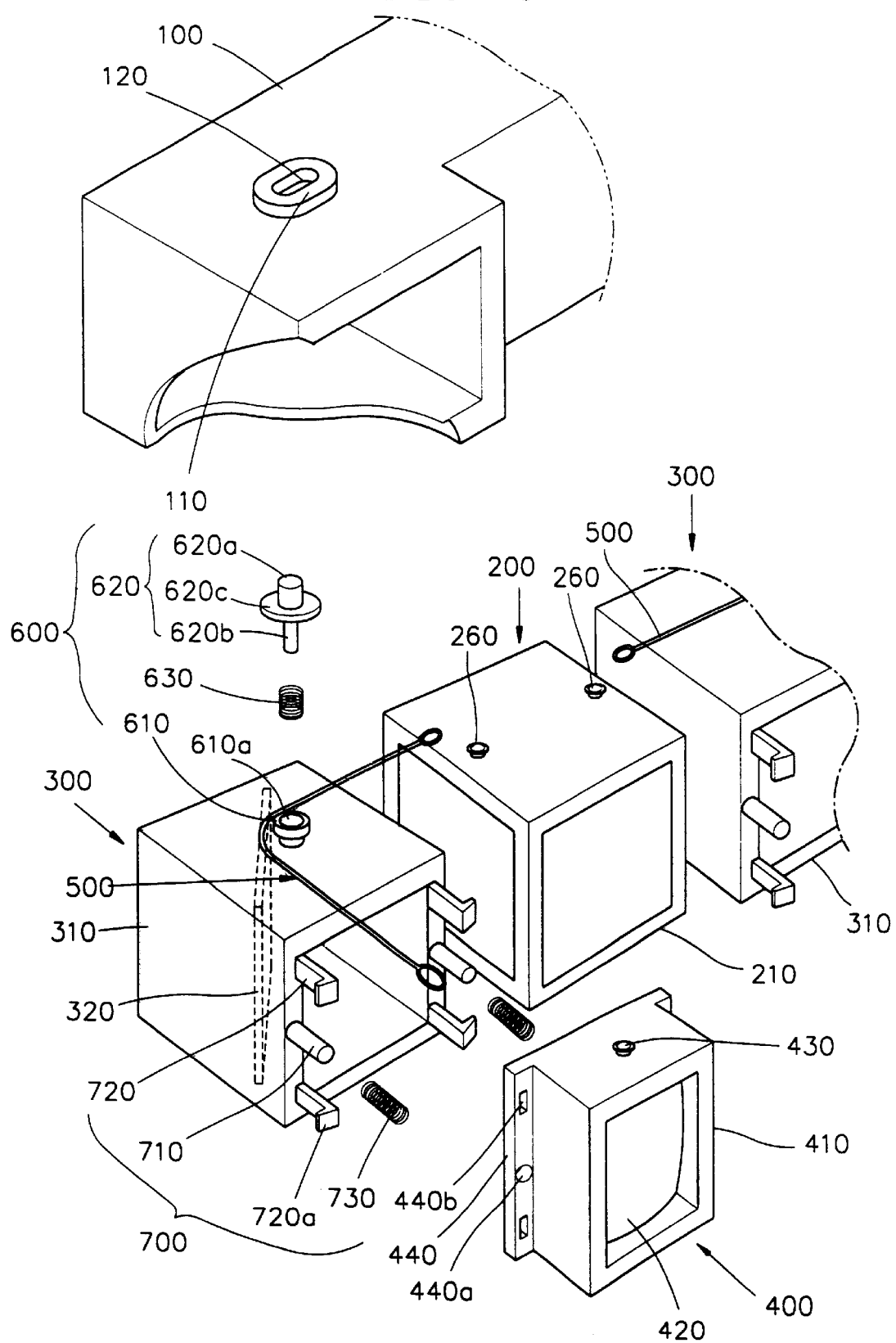
FIG. 5 is an exploded perspective view of a head mounted display apparatus consistent with the present invention.
Figure 6:
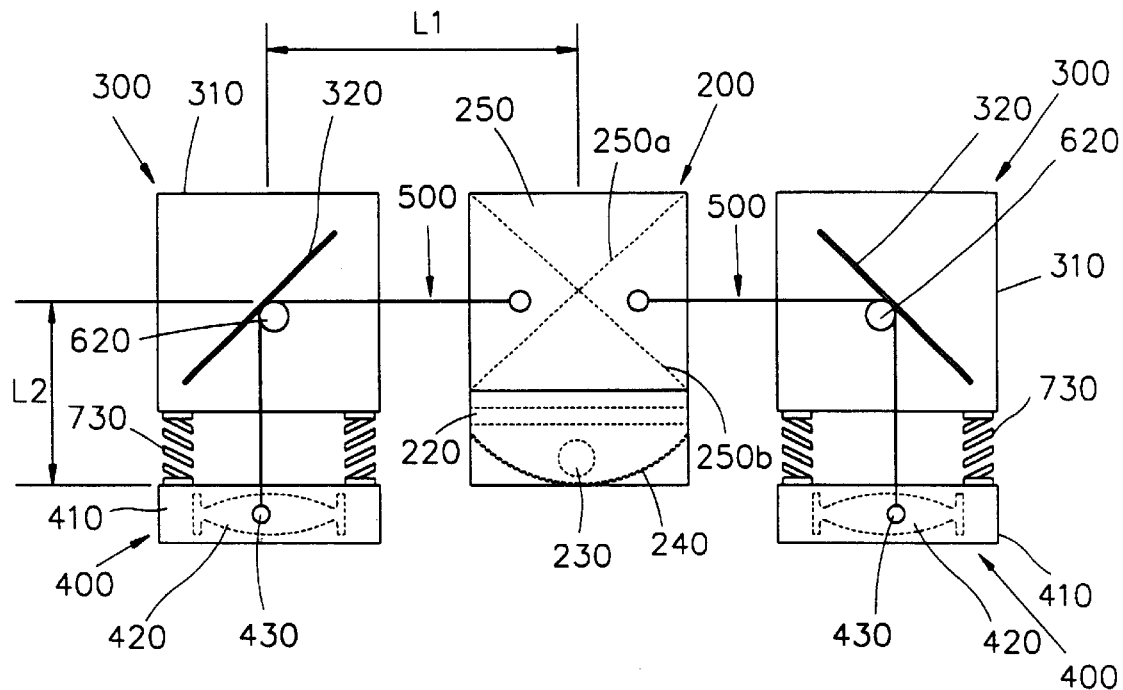
FIG. 6 is a plan view illustrating main components of the head mounted display apparatus consistent with the present invention.

With reference to the accompanying drawings, the head mounted display apparatus consistent with the present invention will now be described. As shown in FIGS. 5 and 6, the head mounted display apparatus consistent with the present invention includes an outer casing 100, an image display unit 200, a reflection unit 300, a lens unit 400 and an optical distance adjusting member or a focal distance adjusting member.

The image display unit 200 for displaying generated images includes a liquid crystal display 220 disposed in an image display unit case 210 so as to generate picture images, and a backlight 230 disposed to the rear of the liquid crystal display 220 to brighten the images. The image display unit 200 also includes a reflection plate 240 disposed to the rear of the backlight 230 to reflect forwardly the light beamed from the backlight 230, and a prism block 250 having a pair of half-mirrors 250a, 250b and disposed in front of the liquid crystal display 220 so that the half-mirror pair 250a, 250b can appropriately reflect the images from the liquid crystal display 220.

The reflection unit 300 is disposed to each side of the image display unit 200 with a predetermined distance therebetween so as to reflect the images generated from the image display unit 200. A reflection mirror 320 is disposed in the reflection unit case 310 of the reflection unit 300 to direct the images reflected from the prism block 250 by 90 degrees.

The lens unit 400 for magnifying the images reflected from the reflection unit 300 includes a lens case 410 disposed in front of the reflection unit case 310 with a predetermined distance therebetween, and a lens 420 disposed in the lens case 410 to magnify the images applied thereto. The optical distance member includes an adjust belt 500, a mirror distance adjusting member 600, and a lens distance adjusting member 700.

An end portion of the adjust belt 500 is fixed to a belt fixing knob 260 disposed on each upper side portion of the image display unit case 210, a mean portion of the adjust belt 500 runs along the outer periphery of a guide unit 610 formed on each upper surface of the reflection unit cases 310, and the other end portion of the adjust belt 500 is fixed to a belt fixing knob 430 formed on each upper surface of the respective lens unit case 410, so that the entire shape of the adjust belt 500 becomes "L" type.

The mirror distance adjust member 600 includes a guide unit 610 having a mounting hole 610a, wherein the diameter of the upper portion of the guide unit 610 is larger than that of the lower portion of the guide unit 610. The mirror distance adjust member 600 also includes an adjust button 620 having a lower protrusion 620b inserted into the mounting hole 610a, an upper protrusion 620a inserted into a guide recess 120 horizontally formed on the upper surface of the outer casing 100, and a flange 620c extended from a mid-periphery of the adjust button 620. A spring 630 is fixed into the mounting hole 610a while being inserted into the lower protrusion 620b of the adjust button 620, thereby elastically and upwardly supporting the adjust button 620.

The lens distance adjust member 700 includes a plurality of guide members 710 formed on a front outer wall of each of the reflection unit cases 310, a plurality of support members 720 respectively having a hook 720a above and below the guide member 710, and a flange 440 extended from the lens case 410 and having a guide hole 440a and a support hole 440b for respectively receiving the guide member 710 and the support member 720 therethrough. The lens distance adjust member 700 also includes a spring 730 to elastically support the lens unit case 410 with the guide member 710 inserted into the guide hole 440a.

The operation of the thusly constituted adjustable head mounted display apparatus will now be described. Initially, the images generated from the liquid crystal display 220 are reflected by the half-mirrors 250a, 250b of the prism block 250 toward each side of the prism block 250, and the reflected images are forwardly reflected by 90 degrees in accordance with the reflection mirror 320 disposed in each of the reflection unit case 310. The forwardly reflected images are magnified by the lens 420 disposed in each lens case 410, and the magnified images become go shaped at each eye of a user.

Figure 7:
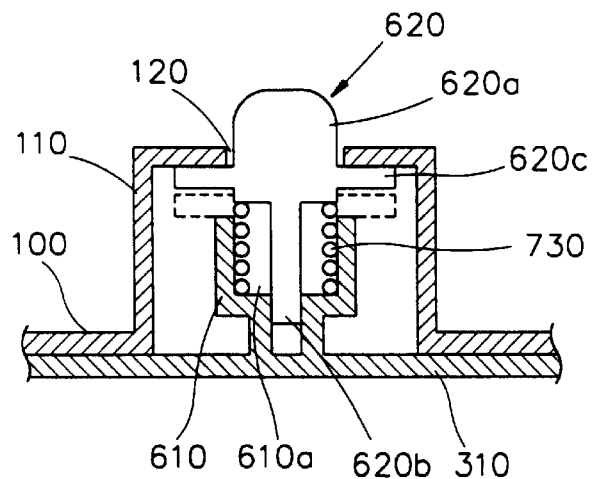
FIG. 7 is a schematic cross-sectional view of an adjust button.
Figure 8A:
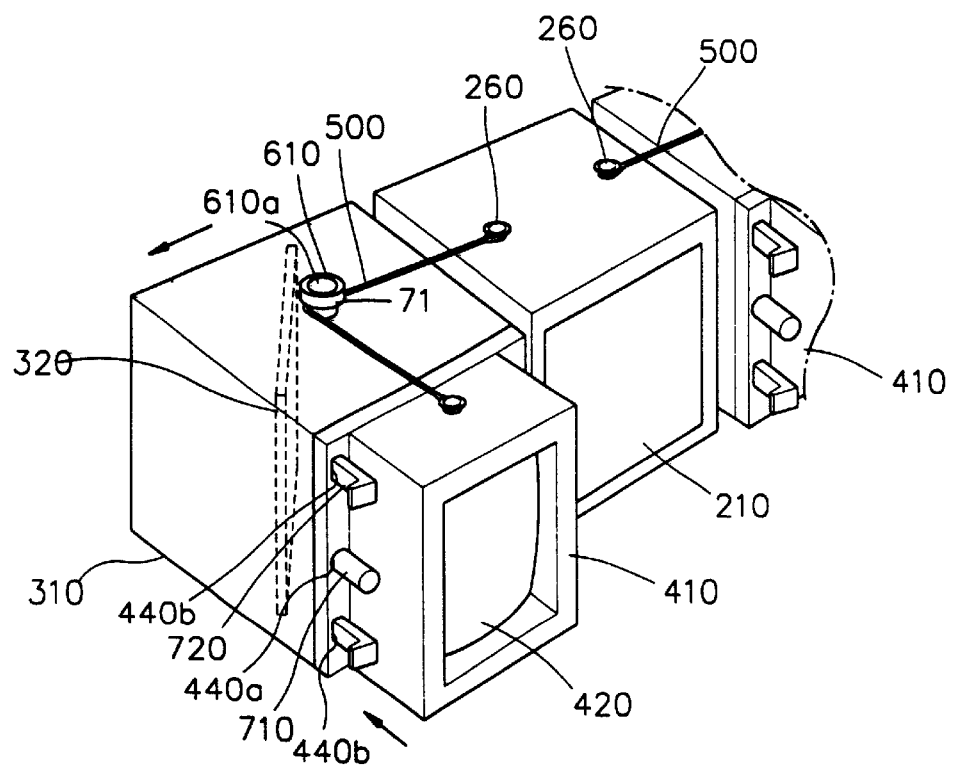
FIG. 8A is a perspective view illustrating a head mounted display apparatus for users with narrow eye bridge span consistent with the present invention.

With reference to FIGS. 7 and 8A, an adjusting method of the head mounted display apparatus in the case that a user's eye bridge span is relatively wide will now be described. First, the adjust button 620 is pressed so as to space the flange 620c of the adjust button 620 to some extent from an inner periphery of the protrusion 110 of the outer casing 100, and each reflection unit case 310 is moved outwardly.

At this time, the adjust button 620 moves along the guide hole 120 formed in the outer casing 100. When the adjust button is released again in the case that an eye location of a user corresponds to a lens location, the flange 620c of the adjust button 620 becomes tightly attached to the inner periphery of the protrusion 110 in accordance with the elastic force of the spring 630, thereby stopping the movement of the reflection unit case 310.

The thusly adjusted state allows the prism block 250 to be elongated from the reflection mirror 320 by a distance L1. At the same time, the respective lens cases 410 become pulled towards the reflection unit case 310 by the adjust belt 500, whereby the distance L2 between the reflection mirror 320 and the lens 420 becomes narrowed. Accordingly, an optical distance which is from the liquid crystal display 220 to the lens 420 is constantly maintained. At this time, the respective lens cases 410 are guided by the guide member 710 and the support member 720 while being elastically supported by the spring 730.

Figure 8B:
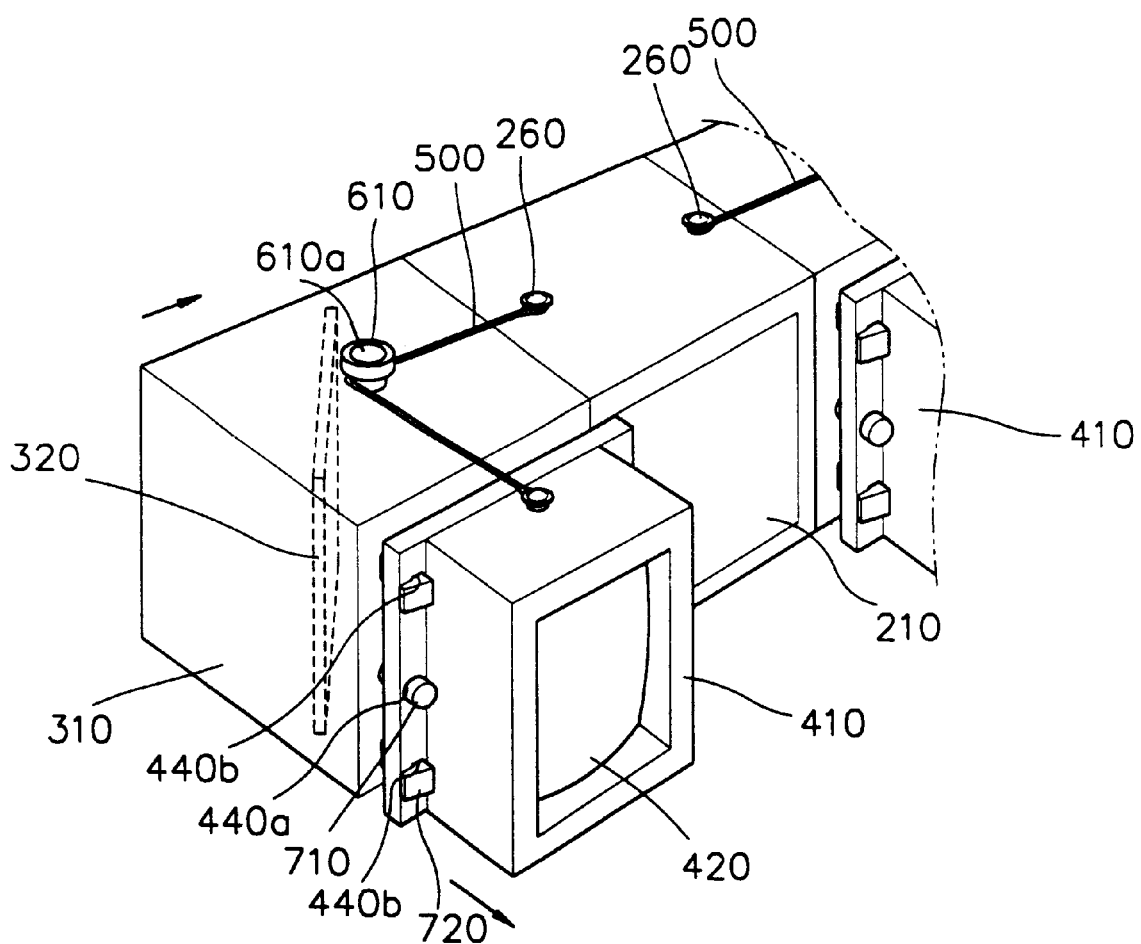
FIG. 8B is a perspective view illustrating a head mounted display apparatus for users with wide eye bridge span consistent with the present invention.

With reference to FIG. 8B, an adjusting method of the head mounted display apparatus in the case that a user's eye bridge span is relatively narrow will now be explained. First, the adjust button 620 is pressed so as to space the adjust button 620 to some extent from an inner periphery of the protrusion 110 of the outer casing 100, and each adjust button 620 is moved inwardly. At this time, due to the movement of the adjust button 620, the reflection unit case 310 is also moved inwardly. When the adjust button 620 is released again in a state in which an eye location of a user corresponds to a lens location, the movement of the respective reflection unit case 310 is stopped.

The thusly adjusted state allows the prism block 250 to be narrowed from the reflection mirror 320 by a distance L1. At the same time, the respective lens cases 410 become dragged away from the reflection unit case 310 by the spring 730, such that the distance L2 between the reflection mirror 320 and the lens 420 becomes widened. Accordingly, an optical distance from the liquid crystal display 220 to the lens 420 is kept constant. At this time, the respective lens cases 410 are hooked in the hooks 720a formed at respective end portions of the support members 720 to prevent them from escaping.

As described above, the adjustable head mounted display apparatus according to the present invention allows the optical distance adjust member to maintain a constant optical distance between the image display unit and the reflection unit and between the image display unit and the lens unit, or a focal point of the lens so as to provide a stable screen image, thereby preventing eye fatigue from occurring due to unstable screen images.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claim, and therefore all changes and modifications that fall within meets and bounds of the claim, or equivalences of such meets and bounds are therefore intended to embrace the appended claim.

What is claimed is:

1. An adjustable head mounted display apparatus, comprising:

an outer casing;

an image display unit in the outer casing to generate an image;

a reflection unit adjustable with respect to each side of the image display unit, to reflect the image generated from the image display unit;

a lens unit in front of the reflection unit and adjustable with respect to a distance from the reflection unit, to magnify the image reflected from the reflection unit;

an optical distance adjust means for adjusting a distance between the image display unit and the reflection unit and for adjusting a distance between the reflection unit and the lens unit;

wherein said optical distance adjust means comprises an adjust belt having a first end portion fixed to a belt fixing knob disposed on an upper side portion of the image display unit, a middle portion running along an outer periphery of a guide unit on an upper surface of the reflection unit, and a second end portion fixed to a belt fixing knob on an upper surface of the lens unit;

a mirror distance adjust means for adjusting the distance between the image display unit and the reflection unit; and a lens distance adjust means for adjusting the distance between the reflection unit and the lens unit.

2. The apparatus of claim 1, wherein the mirror distance adjust means comprises:

a protrusion unit on an upper side portion of the outer casing and defining a hole therein;

an adjust button having an upper protrusion upwardly inserted into the hole of the protrusion unit, a flange contacted on a bottom surface of the protrusion unit, and a lower protrusion inserted into a mounting hole of the guide unit; and a spring, in the mounting hole and in the lower protrusion of the adjust button, to elastically and upwardly support the adjust button.

3. The apparatus of claim 1, wherein the lens distance adjust means comprises:

a plurality of guide means on a front outer wall of the reflection unit;

a plurality of springs respectively corresponding in one of the plurality of guide means;

a plurality of support means each having a hook at an end portion thereof; and a flange extended from each side of the lens unit and having a plurality of guide holes and support holes for correspondingly receiving the plurality of guide means an support means therethrough.

4. An adjustable head mounted display apparatus, comprising:

an outer casing;

an image display unit in the outer casing to generate an image;

an adjustable reflection unit in the outer casing to reflect the image of the image display unit;

a lens unit in the outer casing, movable in a direction perpendicular to a moving direction of the reflection unit, to magnify the image reflected from the adjustable reflection unit;

an optical distance adjust means for adjusting a distance between the adjustable reflection unit and the lens unit when the adjustable reflection unit is moved with respect to the image display unit;

wherein the optical distance adjust means comprises an adjust belt having a first end portion fixed to a belt fixing knob disposed on an upper side portion of the image display unit, a middle portion running along an outer periphery of a guide unit on an upper surface of the reflection unit, and a second end portion fixed to a belt fixing knob on an upper surface of the lens unit;

a mirror distance adjust means for adjusting the distance between the image display unit and the reflection unit; and a lens distance adjust means for adjusting the distance between the reflection unit and the lens unit.

5. An adjustable head mounted display apparatus, comprising:

an outer casing;

an image display unit in the outer casing to generate an image;

a reflection unit adjustable with respect to each side of the image display unit, to reflect the image generated from the image display unit;

a lens unit in front of the reflection unit and adjustable with respect to a distance from the reflection unit, to magnify the image reflected from the reflection unit;

an optical distance maintaining structure which simultaneously adjusts a distance between the image display unit and the reflection unit and a distance between the reflection unit and the lens unit;

wherein the optical distance maintaining structure comprises an adjust belt having a first end portion fixed to a belt fixing knob on an upper side portion of the image display unit, a middle portion running along an outer periphery of a guide unit on an upper surface of the reflection unit, and a second end portion fixed to a belt fixing knob on an upper surface of the lens unit;

a mirror distance adjusting portion to adjust the distance between the image display unit and the reflection unit; and a lens distance adjusting portion to adjust the distance between the reflection unit and the lens unit.

6. The apparatus of claim 5, wherein the mirror distance adjusting portion comprises:

a protrusion unit on an upper side portion of the outer casing and defining a hole therein;

an adjust button having an upper protrusion upwardly inserted into the hole of the protrusion unit, a flange contacted on a bottom surface of the protrusion unit, and a lower protrusion inserted into a mounting hold of the guide unit; and a spring, in the mounting hole and in the lower protrusion of the adjust button, to elastically and upwardly support the adjust button.

7. The apparatus of claim 5, wherein the lens distance adjusting portion comprises:

a plurality of guides on a front outer wall of the reflection unit;

a plurality of springs respectively corresponding in one of the plurality of guides;

a plurality of support structures each having a hook at an end portion thereof; and a flange extending from each side of the lens unit and having a plurality of guide: holes and support holes for correspondingly receiving the plurality of guide means and support means therethrough.

8. An adjustable head mounted display apparatus, comprising:

an outer casing;

an image display unit in the outer casing to generate an image;

an adjustable reflection unit in the outer casing to reflect the image of the image display unit;

a lens unit in the outer casing, movable in a direction perpendicular to a moving direction of the adjustable reflection unit, to magnify the image reflected from the adjustable reflection unit;

an optical distance maintaining structure to adjust a distance between the adjustable reflection unit and the lens unit while the adjustable reflection unit is moved with respect to the image display unit;

wherein the optical distance maintaining structure comprises an adjust belt having a first end portion fixed to a belt fixing knob on an upper side portion of the image display unit, a middle portion running along an outer periphery of a guide unit on an upper surface of the reflection unit, and a second end portion fixed to a belt fixing knob on an upper surface of the lens unit;

a mirror distance adjusting portion to adjust the distance between the image display unit and the reflection unit; and a lens distance adjusting portion to adjust the distance between the reflection unit and the lens unit.

9. For head mounted display apparatus including an outer casing, an image display unit in the outer casing to generate an image, a reflection unit adjustable with respect to each side of the image display unit, to reflect the image generated from the image display unit, and a lens unit in front of the reflection unit and adjustable with respect to a distance from the reflection unit, to magnify the image reflected from the reflection unit, an adjust belt having a first end portion fixed to a belt fixing knob on an upper side portion of the image display unit, a middle portion running along an outer periphery of a guide unit on an upper surface of the reflection unit, and a second end portion fixed to a belt fixing knob on an upper surface of the lens unit, and a method of adjusting a head mounted display apparatus, comprising:

simultaneously adjusting a distance between the image display unit and the reflection unit and a distance between the reflection unit and the lens unit.

10. For head mounted display apparatus including an outer casing, an image display unit in the outer casing to generate an image, an adjustable reflection unit in the outer casing to reflect the image of the image display unit, and a lens unit in the outer casing, movable in a direction perpendicular to a moving direction of the adjustable reflection unit, to magnify the image reflected from the adjustable reflection unit, an adjust belt having a first end portion fixed to a belt fixing knob on an upper side portion of the image display unit, a middle portion running along an outer periphery of a guide unit on an upper surface of the reflection unit, and a second end portion fixed to a belt fixing knob on an upper surface of the lens unit and a method of adjusting a head mounted display apparatus, comprising:

adjusting a distance between the adjustable reflection unit and the lens unit while the adjustable reflection unit is moved with respect to the image display unit.

* * * * *